March 31, 1953     L. R. SPAULDING     2,633,403
OSCILLOSCOPE PHOTOGRAPHIC SYSTEM
Filed March 31, 1949
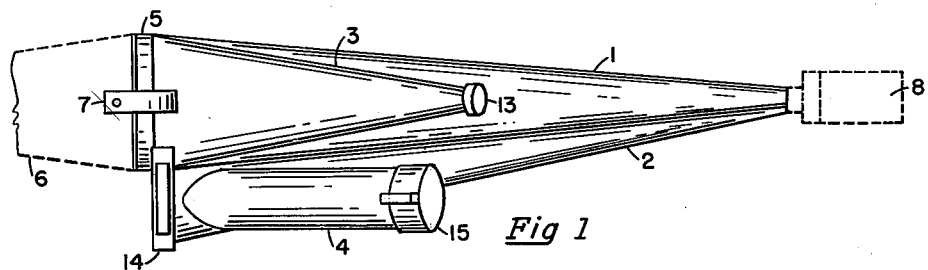
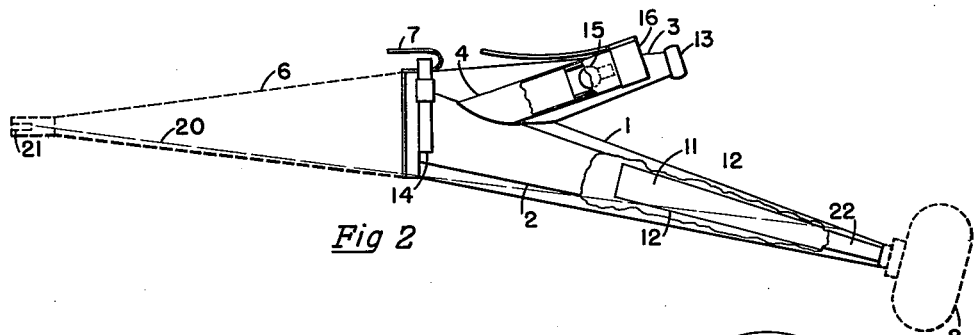
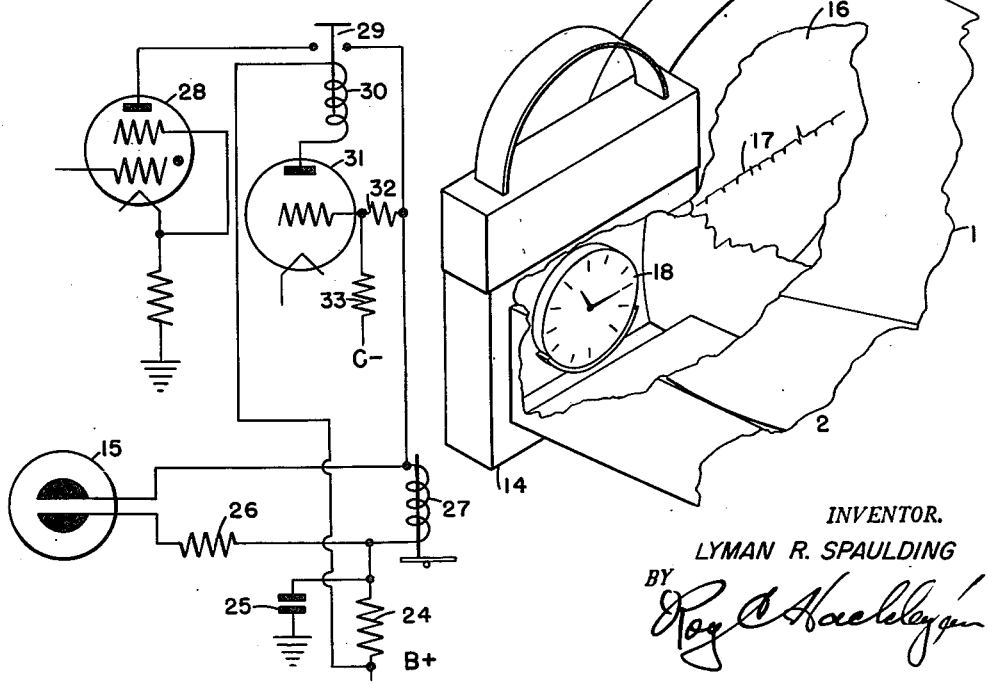
INVENTOR.
LYMAN R. SPAULDING Patented Mar. 31, 1953

2,633,403

UNITED STATES PATENT OFFICE 2,633,403

OSCILLOSCOPE PHOTOGRAPHIC SYSTEM

Lyman R. Spaulding, Portland, Oreg., assignor to the United States of America as represented by the Secretary of the Interior Application March 31, 1949, Serial No. 84,665

6 Claims. (Cl. 346—110)

(Granted under Title 35, U. S. Code (1952), sec. 266)

The invention described herein may be manufactured and used by or for the Government of the United States for governmental purposes without the payment to me of any royalty thereon in accordance with the provisions of the act of April 30, 1928 (Ch. 460, 45 Stat. L. 467).

This invention is concerned with the photography of the images appearing on the screens of cathode ray oscilloscopes together with the photographing of a timing indicator. Cathode ray oscilloscopes produce a screen image lasting only a short time. In some applications of these instruments the image may occur only at unpredictable times thus requiring that the camera and the contained photographic film be left ready for exposure for indefinite periods usually of the order of an hour.

During these periods of waiting for an exposure, the oscilloscope tube produces a faint illumination directly from its cathode which passes through the screen and gradually fogs the film. This has been observed by others and as expedients to assure a reasonably unfogged film color selective filters have been used and the film has ben periodically changed to provide a new film after the preceding film has been appreciably exposed to the stray oscilloscope light.

The periodic replacement of film to circumvent the fogging is a nuisance and an expense which can be minimized by my invention. Accordingly a principal object of my present invention is to produce an oscillograph photographic system which will permit the exposure of film to the inactive oscilloscope screen a maximum length of time with a minimum of fogging.

In the photography of oscilloscope records it is usual to need a record of time photographed at the instant of occurrence of the photographed phenomenon. Means for fulfilling this requirement constitute a second object of this invention. Another object is to provide in connection with the time record, means for illuminating the time indicator momentarily for photography.

The photography of oscilloscopic images requires adjustment of the camera and the associated parts and means for observing the performance of the equipment. Hence, another object of this invention is to provide appropriate means for observing the oscilloscope screen during preparation for the photography.

What constitutes my present invention is described with reference to the accompanying drawing in the specification following and is succinctly defined in the appended claims.

In the drawing, Figure 1 is an external top view of a preferred form of embodiment of part of my invention. Figure 2 is a side elevational view, partly in section. Figure 3 is a perspective view of part of my invention showing in the normal relative locations, an oscilloscope screen and a time indicating instrument. Figure 4 shows, in schematic form, a circuit diagram of the electrical arrangement used for momentarily illuminating the time indicator.

In Figure 1 my invention comprises three cones 1, 2, and 3, and a cylinder 4. At the front of the cones a fitting ring 5 is provided to adapt the assemblage to the front of the oscilloscope, of which the oscilloscope cathode-ray tube 6 is indicated in dotted lines. A clip 7 is provided for convenience in holding the assemblage in place on the oscilloscope. At the small end of cone 1 provision is made for mounting a camera 8, shown dotted.

The structural arrangement of cones 1 and 2 is such that they are concentric at the camera lens, and laterally separated at the plane of the oscilloscope screen. The two cones 1 and 2 are cut out along the two lines where they coincide so the camera lens has a view through the resulting slot to photograph the time indicator. This is shown in the cut-away portion of Figure 2, in which lines 11 and 12 are the lines of coincidence of cones 1 and 2. The space between lines 11 and 12 is cut out and the two cones 1 and 2 are fastened along these two lines as by welding or soldering.

Cones 1 and 3, as shown in Figures 1 and 2, are as described for cones 1 and 2, joined along their line of coincidence. The portions of cones 1 and 3 within their common line are cut out so that cone 3 gives a view of the oscilloscope screen. At the apex of cone 3 there is a closure 13 which can be opened for visual inspection of the screen of oscilloscope tube 6.

Cylinder 4 is cut into cone 2 in a way analogous to the way cone 3 is cut into cone 1. The purpose of cylinder 4 is to support and to enclose means for illuminating the time indicator in a housing 14. Cylinder 4 contains an electric lamp 15 preferably of a gaseous discharge type supported in a removable cap and socket 16.

The spacial arrangement of the oscilloscope tube 6 and the time indicating assemblage is shown in Figure 3. An oscilloscope screen 16 with an illustrative oscilloscopic trace 17 is shown at the end of cone 1. A clock 18 is shown in the housing 14. Cone 1 is placed to afford a full view of screen 17 and cone 2 to afford a view of clock 18.

Referring again to Figure 2, a dashed line has been drawn from the cathode 21 of oscilloscope tube 6 to the upper surface of cone 1 at a point 22. Point 22 is above the field of view of camera 8. No light from cathode 21 can go directly to a point below 22 in cone 1. The inside of cone 1 is coated with non-reflecting black paint so that light from cathode 21 is not appreciably reflected or scattered. Thus the lens of camera 8 being below the line from cathode 21 to point 22 is protected from unwanted exposure. At the same time, the lens of camera 8 has a full view of screen 16 of cathode ray tube 6 and of the timer 18.

In the operation of the recording system, it is necessary that lamp 15 be illuminated only for brief periods at the approximate time of occurrence of the oscilloscopic record 17. This momentary illumination of lamp 15 is accomplished by the circuit shown in Figure 4. Power for lamp 15 is provided by a battery grounded at one terminal and connected to the circuit where indicated by B+. A ballast resistor 24 is provided for current limitation. A condenser 25 is connected to provide for current surges exceeding the momentary current capacity of the battery. Condenser 25 is connected to lamp 15 through a current limiting resistor 26, and through another path in parallel therewith including coil 27. Coil 27 is the actuating coil of a solenoid or other electro-mechanical device capable of operating camera 8 once for each operation of the oscilloscope 6 and lamp 15.

The circuit is closed through a gas-filled tetrode 28 and a normally closed electrically operated switch 29. Switch 29 is held normally closed by current in a coil 30, provided by the plate circuit of a triode 31. The grid of triode 31 is held normally at a voltage which is approximately that of B+ by a grid resistor 32 of high resistance. A grid bias resistor 33 is provided and connected to provide a negative grid voltage under certain conditions.

In the operation of the system, the control grid of tetrode 28 causes tetrode 28 to become conducting. A surge of current from condenser 25 flows through resistor 26 and lamp 15. The current through resistor 26, gradually, but in a fraction of a second, decreases with a corresponding increase in current in coil 27. Lamp 15 thus is illuminated only for a length of time corresponding to the time constant of the circuit containing coil 27. When tetrode 28 becomes conducting the voltage on the plate thereof falls quickly to a value much less than B+. This decreased voltage is less than C— so the grid of triode 31 becomes sufficiently negative to decrease the plate current thereof flowing through coil 30 to a comparatively small value. When this occurs, the contacts of normally closed switch 29 open restoring tetrode 28 to a normally high impedance condition.

The surge of current through coil 27 operates camera 8. This operation advances the exposed frame of film in camera 8 bringing a new frame of film into position for the next exposure. The shutter of camera 8 is locked open manually at all times except when camera 8 is to be removed from cone 1. The operation of the circuit shown in Fig. 4 excites lamp 15, illuminating clock 18 momentarily after the occurrence of a transient in oscilloscope 6 capable of initiating operation of tetrode 28. This operation follows the exposure of the transient in oscilloscope 6 by a small fraction of a second. The transients in oscilloscope 6 for which this system is usually used occur in single non-repetitive sweeps of the cathode ray. This makes the use of the shutter in camera 8 unnecessary in normal operation. Thus it will be understood that the operation of camera 8 is that of advancing the film one frame rather than that of operating the conventional shutter. It is this characteristic of operation that requires the arrangement of cone 1 to prevent fogging the film when the length of time between successive operations is appreciable.

It will be apparent that some of the elements of my present invention have utility for individual use. However, the invention as a whole is required to operate the photographic system for the best results. Accordingly I claim:

1. In combination, an oscilloscope having an axis on which is a cathode which glows when operating, and a view screen, a camera having an optical axis, said camera being placed on the side of said view screen opposite said cathode, a light-tight hood connecting the camera and said view screen, said oscilloscope axis and the optical axis of said camera making such an obtuse angle that the camera does not have a direct view of the cathode through the view screen.

2. The combination of claim 1, in which the light-tight hood has a conical shape and has a light absorbing surface.

3. The combination of claim 1, in which the light-tight hood has a conical shape and a light absorbing interior surface, the arrangement between the parts being such that a line from the cathode through the point of the view screen nearest the camera strikes the interior light absorbing surface of the hood.

4. In an oscilloscope photographic system, the combination of first and second light-tight hoods each having a small open end and a large open end, each of said large open ends defining the perimeter of a different plane field of view, the small open ends of said first and second hoods being concentric and having an unimpeded view of both fields of view defined by the open ends of said first and second hoods, the overlapping portions of said first and second hoods being omitted, a third light-tight hood having a small open end displaced from said concentric open ends of said first and second hoods, said small open end of said third hood having an unimpeded view of the field of view defined by said first hood. A fourth light-tight hood merging with the second hood, the end of said fourth hood remote from the large end of said second hood containing a light source arranged to illuminate the field of view defined by the large end of said second hood, the axes of said first, second, third and fourth hoods making acute angles with each other, the axis of said first cone making an angle with the plane field of view defined by the large end of said first cone.

5. The combination of claim 4 in which the first, second and third hoods are substantially conical in shape and in which the fourth hood is substantially cylindrical.

6. The combination of claim 4 in which the combination of hoods is attached to a camera with a lens, a clock and a cathode ray tube having a cathode and a viewing screen, the screen of the tube being substantially in the field of view defined by the first hood, the camera lens being at the concentric small openings of the first and second hoods and the cathode being on the side of said screen remote from said camera lens, the angle between the axis of the first hood and the plane field view of the first hood being such that the camera lens does not have a view through the said screen of the said cathode, the clock being in the field of view of said second hood.

LYMAN R. SPAULDING.

REFERENCES CITED

The following references are of record in the file of this patent:

UNITED STATES PATENTS

| Number | Name | Date |
|---|---|---|
| 1,736,456 | Matthias | Nov. 19, 1929 |
| 2,160,006 | Thompson et al. | May 30, 1939 |
| 2,166,440 | Jones | July 18, 1939 |
| 2,169,726 | George | Aug. 15, 1939 |
| 2,186,268 | Pakala | Jan. 9, 1940 |
| 2,200,095 | Marton | May 7, 1940 |
| 2,406,152 | Levine | Aug. 20, 1946 |

FOREIGN PATENTS

| Number | Country | Date |
|---|---|---|
| 473,043 | Great Britain | Oct. 5, 1937 |
| 729,315 | France | Apr. 25, 1932 |